Figure 1:
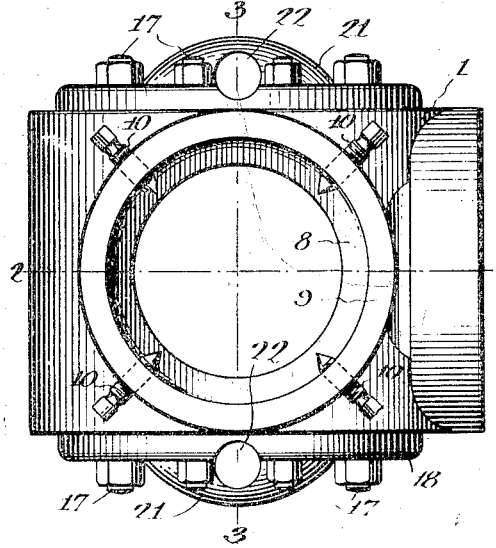

A. G. HEGGEM.
CONTROL CASING HEAD.
APPLICATION FILED MAR. 4, 1914.

1,092,441. Patented Apr. 7, 1914.
2 SHEETS—SHEET 1.

Witnesses:
Elton W. Miller
Carl D. Smith

Inventor:
Alfred G. Heggem

A. G. HEGGEM.
CONTROL CASING HEAD.
APPLICATION FILED MAR. 4, 1914.

1,092,441.

Patented Apr. 7, 1914.
2 SHEETS—SHEET 2.

Witnesses:
Elton W. Miller
Carl D. Smith

Inventor:
Alfred G. Heggem

UNITED STATES PATENT OFFICE.

ALFRED G. HEGGEM, OF PITTSBURGH, PENNSYLVANIA.

CONTROL CASING-HEAD.

1,092,441.  Specification of Letters Patent.  Patented Apr. 7, 1914.

Application filed March 4, 1914. Serial No. 822,292.

(DEDICATED TO THE PUBLIC.)

*To all whom it may concern:*

Be it known that I, ALFRED G. HEGGEM, a citizen of the United States, residing at Pittsburgh, in the county of Allegheny and State of Pennsylvania, have invented new and useful Improvements in Control Casing-Heads, of which the following is a specification.

In accordance with the provisions of the act of Mar. 3, 1883, ch. 143, 22 Stat. L. 625, it is hereby stipulated that the invention described herein may be used by the Government, or any of its officers or employees in prosecution of work for the Government, or by any other person in the United States, without the payment to me of any royalty thereon.

This invention relates to improvements in casing heads for oil, gas or other wells and includes a valve for controlling the flow of gas, oil, water or other fluid from a well.

An object of the invention is to provide a casing head simple and compact in design and having a controlling valve which when in certain positions will permit the usual drilling and shooting operations, but which may be quickly turned to operative positions for controlling the flow of oil, gas, or other fluid as occasion may require.

Another object is to so design the casing head and valve operating means that projecting and other portions will not be liable to injury when subjected to the necessarily rough handling incident to transportation and use.

Another object is to adapt such a casing head to be used as a casing connection and provide means for protecting the connecting elements when not so used.

With the foregoing and other objects in view, reference is had to the accompanying drawings wherein like reference characters denote corresponding parts throughout the several views.

Figure 4:
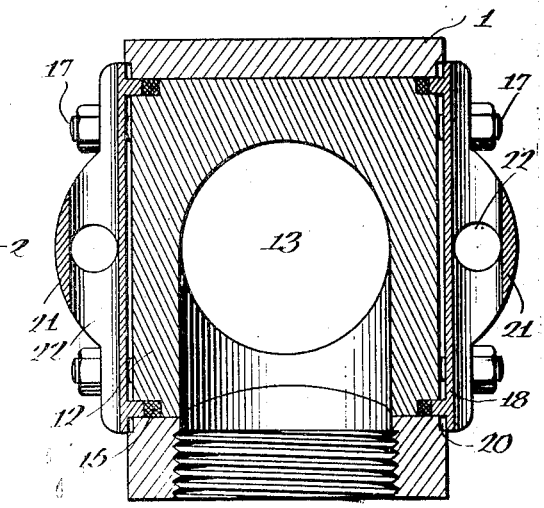
Figure 2:
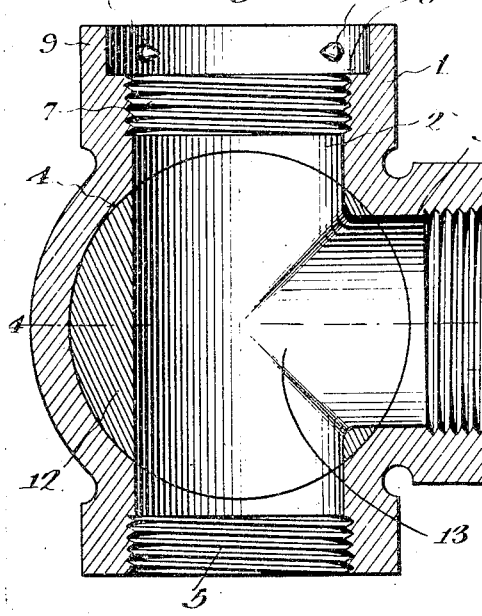
Figure 3:
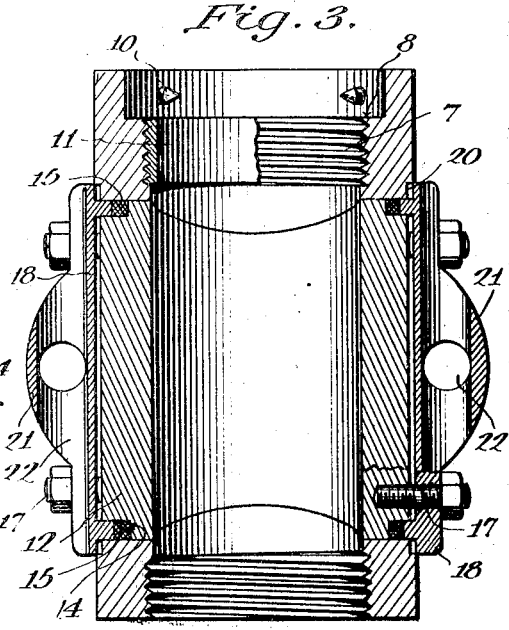
Figure 5:
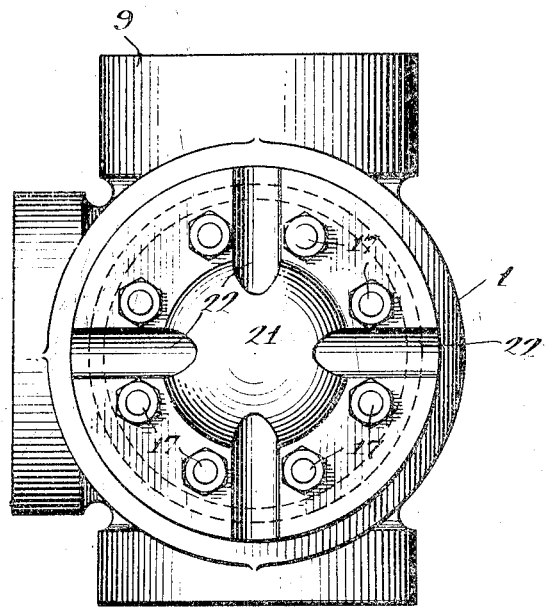
Figure 6:
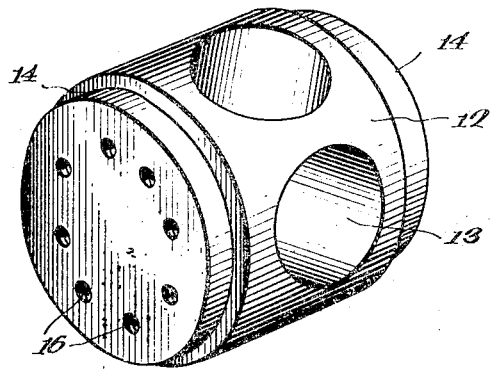
Figure 7:
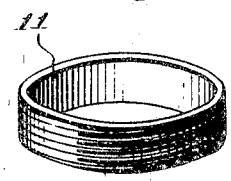

Figure 1 is a plan view of a casing head constructed in accordance with the present invention. Fig. 2 is a vertical section on the line 2—2 of Fig. 1. Fig. 3 is a vertical section on the line 3—3 of Fig. 1, looking toward the left. Fig. 4 is a horizontal section on the line 4—4 of Fig. 2. Fig. 5 is a side elevation of the device. Fig. 6 is a perspective view of the valve plug. Fig. 7 is a perspective view of a protective casing nipple.

The casing head comprises a T body, 1, having a longitudinal bore, 2, a transverse passage, 3, forming together a three-way passage, and a cylindrical bore, 4, at right angles to the longitudinal bore and to the transverse passage in the plane of the latter. Each end of the three-way passage is screw-threaded at 5, 6 and 7, respectively, the threads at 5 designed to secure the head to the well casing, the threads at 6 permitting attachment of a flow line from the head to a flow tank, and the threads at 7 permitting any desired pipe connection or the insertion of a plug to close the opening and prevent any small leakage which may possibly occur around the valve. The opening at the top above the threads 7 is counterbored to provide a shoulder 8 and flange 9 for seating an ordinary oil saver disk, which may be held in place by set screws 10. The bore 2 permits the entrance of tools for drilling or of a torpedo when it is desired to shoot the well. During drilling operations the threads 7 are protected by a short nipple 11 inserted as shown in Fig. 3.

Within the bore, 4, is mounted a cylindrical valve plug, 12, having a three-way passage, 13, corresponding to the three-way passage of the T body, 1, and registering therewith when in open or inoperative position as shown in Fig. 2. The ends of the valve, 12, are reduced to form annular recesses, 14, to receive asbestos, hydraulic or other suitable packing rings 15. The ends of the valve plug are further provided with holes, 16, for the reception of bolts, 17, which secure the plates or glands, 18, in place. The plates, 18, are each provided with a flange, 19, for compressing the packing, 15. That portion of each plate, 18, outside the flange, 19, overlaps the body of the casing head to retain the valve plug in place. The casing head is further annularly recessed or counterbored at 20 to fit the glands, 18, and to receive a gasket, not shown, if further packing be desired. Each plate or gland, 18, is provided with an exterior raised portion, 21, and is recessed as at 22 to enable the insertion of a pinch bar or a piece of pipe to serve as a valve handle. Incidentally the recesses, 22, may be arranged as shown whereby the position of the passages in the valve relative to the passages in the T head may be indicated.

The operation of the device is apparent. When it becomes desirable to control the well, the valve may be turned within its seat in any one of three ways. By turning 90° counter clockwise from the position shown in the several figures of the drawing, the fluid may be shut within the well, leaving both horizontal and top openings free and unobstructed, or it may be turned 90° in clockwise direction and prevent vertical flow of fluid, which would then be deflected through the side outlet and conducted by means of a lead line to a flow tank. A movement of 180° would exclude fluid from the side outlet and yet permit free passage through the top opening.

In operation it will become apparent that with this casing head on the top of a well there is no need of wasting any oil or gas. Even that fluid which at present is lost when shooting a well can be saved; thus, after a torpedo has been set and the squib started into the well, the valve plug may be turned to close the top opening in the casing head and the fluid thrown from the well by the shot will pass through the side outlet and lead line and be collected in tanks. Another contingency which will be taken care of is where gas is encountered unexpectedly and catches fire at the head of the well. This casing head may be closed promptly, leaving a very small opening about the drilling line through which only a small amount of gas could escape and the flames immediately brought under control without danger to the rig or to the lives of the workmen.

In place of screw threads at 5 or 6, any other well known fastening means may be employed.

I claim—

1. A casing head comprising a body having a longitudinal bore, a transverse passage opening therefrom, and a transverse cylindrical bore at right angles to the longitudinal bore and to the transverse passage and in the plane of the latter, a cylindrical valve plug fitting the cylindrical bore and having a three-way passage corresponding to the longitudinal bore and transverse passage of the body and registering therewith when in open or inoperative position, and plates secured to the ends of the valve plug and overlapping the body to retain the valve in place and whereby the valve may be turned to its several positions.

2. A casing head comprising a T body having a longitudinal bore, a transverse passage opening therefrom, and a transverse bore in the plane of and at right angles to the transverse passage, a rotary valve plug fitting said transverse bore and having a three-way passage corresponding to the longitudinal bore and transverse passage of the body, said valve plug having its ends reduced forming an annular recess at each end providing a seat for an annular packing ring, and plates secured to the ends of the valve plug and overlapping the T body and annular recesses to retain the valve in place and form a fluid-tight joint, and whereby the valve may be turned from either end to its several positions.

3. A casing head comprising a T body having a three-way passage therethrough corresponding to the branches of the T body and a bore transversely of the body and its passage at the juncture of the head and stem of the T, a valve plug in said bore having a three-way passage corresponding to that of the T body, and plates secured to the ends of the valve plug and overlapping the T body to retain the valve in place, such plate having exteriorly a recessed raised portion whereby a pinch bar or other tool may be applied for turning the valve to its several positions.

4. A casing head comprising a T body having a three-way passage therethrough and a bore transversely thereof, each end of said bore having an annular countersunk recess for receiving an annular packing ring, a three-way valve plug in said transverse bore, having its ends reduced to form annular recesses, and plates bolted to the ends of the valve and overlapping the annular recesses and the T body to retain the valve in place, and each plate having an annular flange to register with the annular recess of the valve plug to compress the packing therein to form a fluid tight joint.

5. A casing head comprising a T body with a transverse plug valve therein, said body and valve having three-way passages therein corresponding to the branches of the T, each of the three ends of the passage in the body being provided with means for making casing and branch pipe connections, one end of the straight away bore of the T body being screw-threaded and annularly countersunk exteriorly of the screw threads to form a flanged shoulder and provided with set screws for retaining therein an ordinary oil saver disk, and a screw threaded casing nipple engaging the screw threads below said flanged shoulder to protect the threads from injury when not in use as a casing connection.

In testimony whereof, I affix my signature in the presence of two witnesses.

ALFRED G. HEGGEM.

Witnesses:
 JAMES J. DELONEY,
 UNION B. WHITE.